United States Patent [19]

Habinger

[11] 4,093,937

[45] June 6, 1978

[54] AUTOMATIC RUNWAY TRAFFIC DIRECTION CONTROL

[76] Inventor: Max Habinger, P.O. Box D, 500 Leo Ave., Landing, N.J. 07850

[21] Appl. No.: 689,483

[22] Filed: May 24, 1976

[51] Int. Cl.² ............................................. G08G 5/00
[52] U.S. Cl. ..................................... 340/26; 250/215
[58] Field of Search .............. 340/25, 26; 244/114 R; 240/1.2; 116/1, 28 R; 33/227; 250/239, 215; 235/150.22, 150.23; 73/188

[56] References Cited

U.S. PATENT DOCUMENTS

| | | | |
|---|---|---|---|
| 1,776,111 | 9/1930 | Donaldson | 340/26 |
| 1,953,159 | 4/1934 | Eskilson et al. | 340/26 |
| 1,989,295 | 1/1935 | Sewell | 340/26 |
| 2,325,258 | 7/1943 | Mallory | 340/26 |
| 3,488,558 | 1/1970 | Grafton | 340/26 |
| 3,531,765 | 9/1970 | Christianson et al. | 340/26 |
| 3,810,150 | 5/1974 | Jacobs | 340/26 |
| 3,925,704 | 12/1975 | Camic | 340/26 |

Primary Examiner—John W. Caldwell, Sr.
Assistant Examiner—James J. Groody

[57] ABSTRACT

An automated bidirectional sequenced flashing light system is disclosed for the purpose of controlling traffic direction on airport runways and the like. It includes a mastercontrol containing integrated logic circuit and solid state switching circuits, an opto-electronic wind direction sensor and a set of ten or more light assemblies placed midrunways and along runways for a short distance and a pair of same assemblies placed on each runway end or threshold. Integrated circuit components decode signals from sensor and establish direction of flashes and integrated gating provide signals for flashing of the corresponding pair of endlights. A balanced resistor capacitor network is used for crosswind delay.

3 Claims, 8 Drawing Figures

AUTOMATIC RUNWAY TRAFFIC DIRECTION CONTROL

FIELD OF THE INVENTION

This invention relates to airport traffic control, and more particularly to a runway traffic direction identifier, which automatically selects the active runway, signals this information omnidirectionally from the airport, is visible from a practical distance and altitude from the airport and does not require on board equipment.

BACKGROUND OF THE INVENTION

In aviation it is of course well known, that most aircraft movement on the ground as well as in the air is controlled, directed or just anounced by means of radio communication. This requires that in an airport an operator for the radio should be on active duty whenever an aircraft needs landing, take off or taxi information or instruction. It is equally well known, that one of the most important information needed by the pilot is wind direction and runway traffic direction to perform safe landings and take offs. There are many instances, when this radio information is unavailable to the pilot for various reasons; radio may be unattended since operator busy otherwise, radio may be out of order, pilot may have tuned wrong channel or volume turned down, or radio station may be closed during nighthours. Runway approach indicator lights "RAIL's" as used on a few airports, are turned off during nighthours except on a few very large airports with 24 hours operation. RAIL's are manually controlled and become useless once the operator goes home. Most general aviation airports do not own enough real property next to the runways and therefore could not use the RAIL's, besides the enormous cost.

It is exactly in those circumstances that a pilot needs help, when he flies into an airport, radio unattended, runway not exceptionally long where even a little tailwind can endanger the safety of the occupants of the craft and create a dangerous situation. Airport accident statistics show, that most accidents occur on or near airports and many of those accidents are a direct result of a wrong decision made by the pilot. According to federal aviation regulation FAR 91.3(a), the pilot in command of an aircraft is directly responsible for, and is the final authority as to the operation of that aircraft. Due to this fact it is possible that under certain circumstances with unavailable runway traffic direction information and, for example exactly 90° cross-wind or absolute calm, two pilots can legally make two opposing decisions as to which way to land or to take off. This has caused many accidents. Windsocks and windtees do not solve this problem, since they do show the direction of the wind but not necessarely the direction of the runway which should be used. It must be pointed out, that in aviation one runway is normally used from both directions, so the approaching or departing aviator must make a decision as to which way he should use that runway.

The automatic runway traffic direction control, the "ARTRAC" for short, solves this problem well as a prototype installation on a general aviation airport proves out and does it economically.

SUMMARY OF THE INVENTION

In contradistinction to the prior art, the present invention provides a simple arrangement for instant and unerring recognition of the active runway, when runway information via radio is unobtainable, by using a set of ten or more inexpensive incandescent lightbulbs mounted on top of support cones and placed midrunways and along the runway, equally spaced over a total distance of approximately 60 to 80 meters and turned on and off in fast sequence, so as to create the same effect as flashing strobe lights. The rate of the flashes coupled with the spacing of the lights becomes a very important element for the efficiency of the system since it is this element which becomes the communication link. The sequencial direction of the flashes, which indicate the direction traffic is to flow, is controlled by the logic circuit, a combination of an opto electronic wind direction sensor, R C bank, interface, signal detector, bidirectional counter, decoder near zero phase solid state relay, gates and drivers. all electronic components are solid state and contained in a mastercontrol. The wind direction sensor is mounted on a suitable place away from propblasts and electrically connected to the mastercontrol.

This arrangement provides hundreds of millions of flashes without burning out lamps, is extremely reliable and flexible, since it allows use of any lamps including strobes, as long as the heat up or charge up time required for the lamps is not longer than the "ON" or flash time. The system is also easily adapted to multible runways.

OBJECTS OF THE INVENTION

Accordingly, it is an object of the instant invention to provide automated runway traffic direction control to prevent approach and departure accidents.

It is another object of the instant invention to provide an automated runway traffic direction identifier which self-sufficiently selects the active runway.

It is a further object of the instant invention to provide a display of the runway information in such a way as to allow fast and unerring recognition of this runway information.

Other objects of the instant invention as well as further understanding thereof may be had by referring to the following descriptions and drawings.

DETAILED DESCRIPTION

Figure 1:
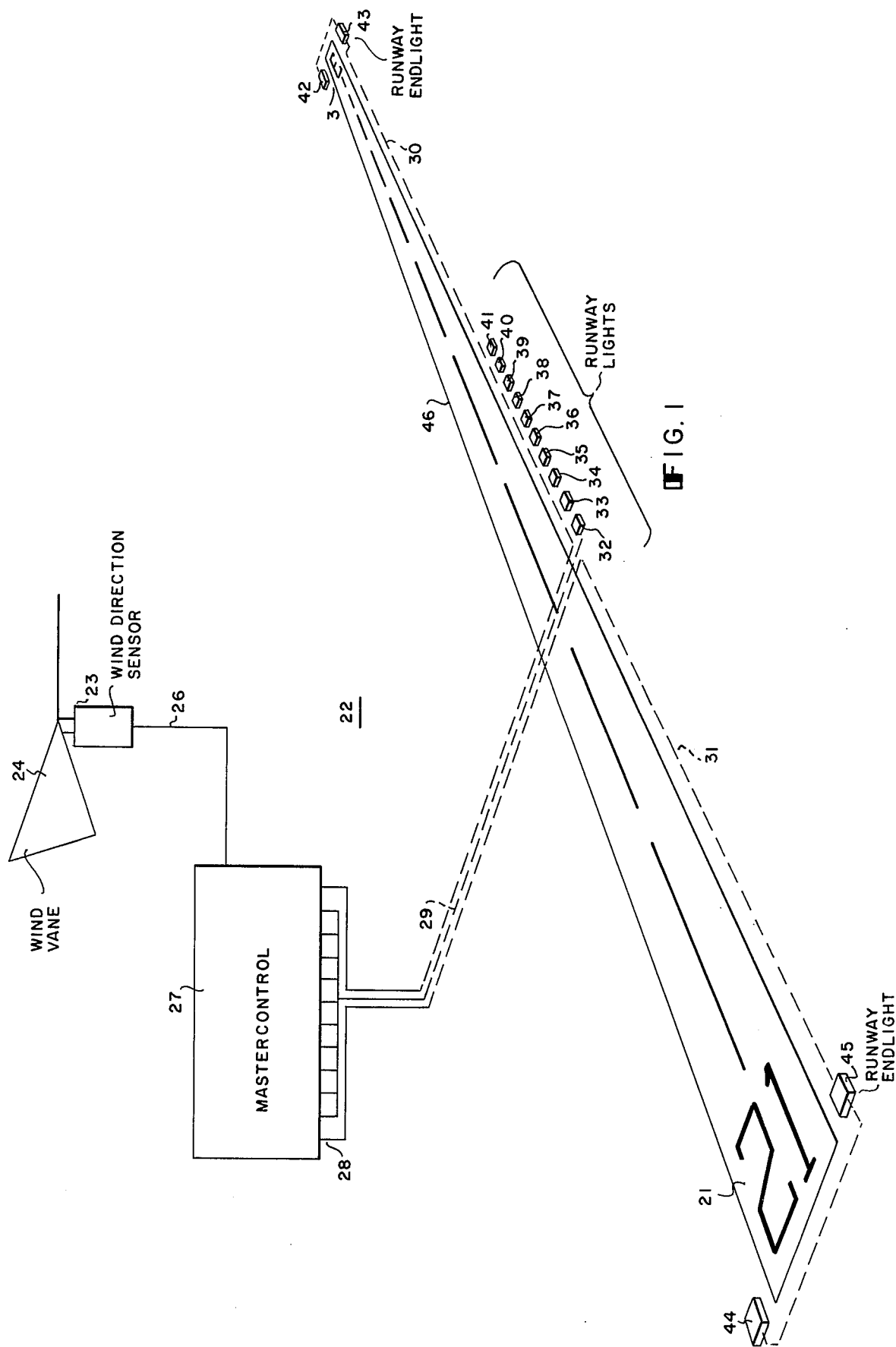
FIG. 1 is a combination of a perspective view of a runway and placement of the lights, and a block diagram of the major components and their interconnections as in a typical application in accordance with the present invention.

In FIG. 1, an automatic runway traffic direction control system 22 is shown as in a typical application, whereas light-assemblies 32,33,34,35,36,37,38,39,40,41 are positioned 6 to 8 meters apart and along the runway 46, over a total distance of approx. 60 to 80 meters or a multible thereof, a pair of runway endlights 42,43 on one end of the runway 46, and another pair of runway endlights 44,45 on the other end of the runway 46, so as endlights are positioned customarily, and connected by means of buried wire harnesses 29,30,31 and conventional connector 28 to mastercontrol 27, which is mounted in tower or remote office. Wind direction sensor 23 is positioned on top of tower or other suitable place away from propblasts and is electrically connected by wire harness 26 to matercontrol 27.

When the wind blows in the direction as from the far end of the runway 46 towards the runway number 21, runway 21 will be the active and traffic is to flow from number 21 towards number 33. Since the wind direction sensor 23 is mounted outside of the buildings and is exposed to the wind, the wind vane 24 of the wind direction sensor 23 will point into the wind and position said sensor 23 so, that an electrical signal transmitted from said sensor 23 to the mastercontrol 27 turns on and off the lights 32,33,34,35,36,37,38,39,40,41 in that sequence and also causes the runway endlights 44,45 to flash. The effect is that the lights 32,33,34,35,36,37,38,39,40,41 seem to run in the direction as from runway number 21 towards runway number 3, the direction traffic is to flow.

When the wind direction changes and begins to blow away from runway number 21 towards runway number 3, the wind vane 24 will rotate the wind direction sensor 23 until wind vane 24 again points into the wind, and the electrical signal from said sensor 23 to the mastercontrol 27 changes, and reverse the on off sequence, so the lights will flash in order as 41,40,39,38,37,36, 35,34,33,32 as will the runway endlights 42,43, while runway endlights 44,45 cease to flash. This change of direction will commence after a preselected time delay, since it is necessary to permitt an aircraft to finish a landing or take off, which has already been committed to that maneuver.

Figure 2:
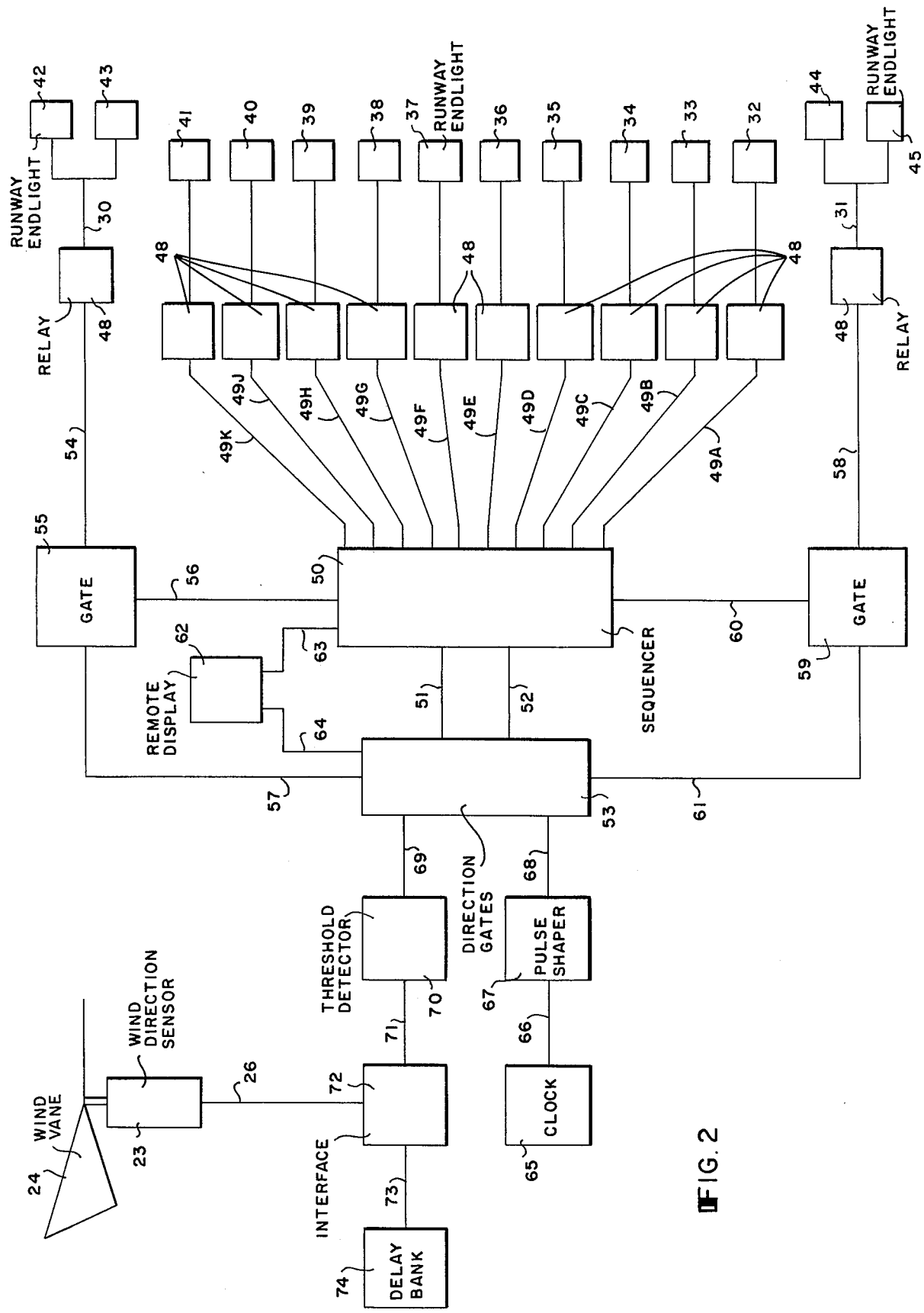
FIG. 2 is a functional block diagram in accordance with the present invention.

In FIG. 2 the light assemblies 32,33,34,35,36,37,38,39,40,41 and 42,43,44,45 are seen as connected each to a near zero phase solid state relay 48, of which there are twelve and due to their design contribute to the reliability of the system, reduce radio frequency interference and are discussed later in the text. Said relays 48 receive their on off signals by wire 49A,49B,49C,49D,49E,49F,49G,49H,49I,49K from the integrated bidirectional sequencer 50, which receives its directional information signal through connection 51 and 52 from the direction gates 53. Runway endlights 44,45 are connected by wire harness 31 to relay 48, which receives its signal through connection 58 from integrated gates 59, which in turn is decoding signal from directional sequencer 50 and direction gates 53 by connections 60 and 61. Runway endlights 42, 43 are connected by wire harness 30 to relay 48, which receives its signal through connection 54 from integrated gates 55, which in turn is also decoding signal from directional sequencer 50 and direction gates 53 by connections 56 and 57.

A mastercontrol panel or remote display 62, showing the same information as the flashing lights on the runway is connected to the directional sequencer 50 and direction gates 53 by wire harnesses 63 and 64.

Direction gates 53 provides forward or reverse counting pulses to the bidirectional sequencer 50 by integrating a clock pulse, originated in the temperature controlled unijunction transistor oscilator, the clock 65, transmitted in connection 66 to integrated pulse shaper 67 and through connection 68.

The directional signal is received by directional gates 53 through connection 69 from the signal decoder detector 70, which receives its signal from the interface 72 through connection 71. A high or low signal from the wind direction sensor 23 fed to the interface 72 through wire harness 26 is by means of a switch not shown here but part of the interface 72, selectively connected to a timing integrator 74 consisting of capacitors by connection 73. Another multible switch not shown here, the mode selector switch is part of the interface 72 and serves to provide three positions, one for automatic operation, and one for manual override, one for each runway direction.

Figure 3:
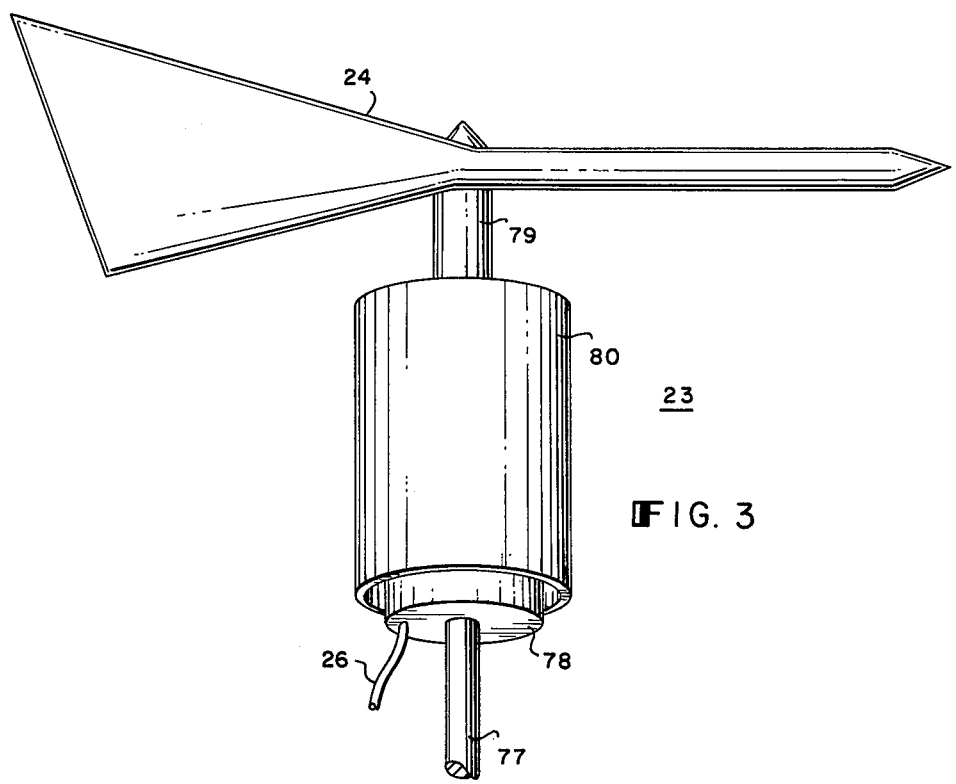
FIG. 3 is a perspective view of the wind direction sensor as used in accordance with the present invention.

In FIG. 3, the wind direction sensor 23, which produces the electrical direction signal, can be seen a shaft 77 onto which a component baffle 78 is firmly fastened. A tubular shaft 79, to which is firmly attached the segment baffle 80 and wind vane 24, is moveable retained to shaft 77 by means of two ballbearings not shown here. Therefore wind vane 24 can rotate freely and since it is mounted outdoors and subjected to the wind it will allways point into the wind, and position the segment baffle 80 in reference to the wind direction.

Figure 4:
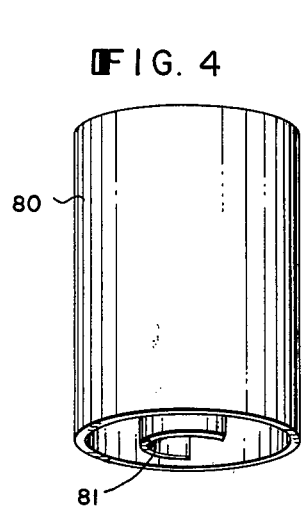
FIG. 4 is a perspective view of the segment baffle, a part of the wind direction sensor, particularly showing the semi-circular segment in accordance with the present invention.

In FIG. 4, a perspective view of the segment baffle 80, includes the segment 81, a semi circular cylinder, so as a tube cut in half length wise, and which functions as the shading segment.

Figure 5:
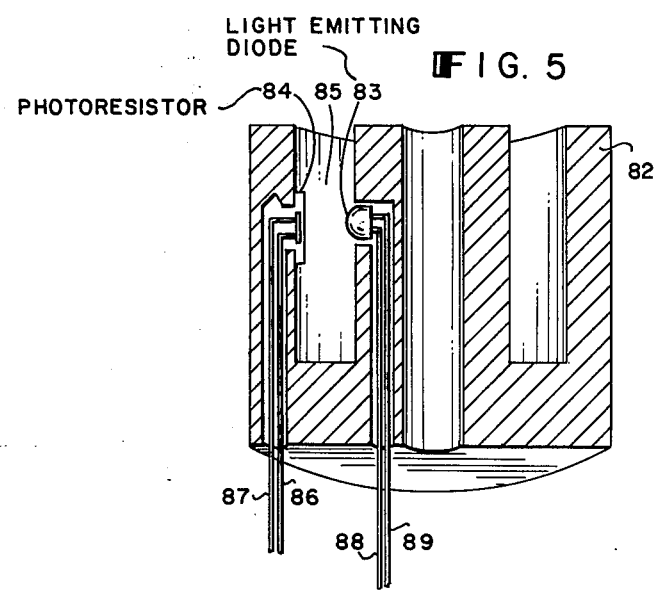
FIG. 5 is an enlarged crossectional view of the component baffle, a part of the wind direction sensor which carries the electronic components in accordance with the present invention.

In FIG. 5, an enlarged view of the component baffle 78 in crossection, shows the position of a light emmitting diode 83 which is biased with a voltage through wire 88 and 89 to produce light, which is radiated through gap 85 towards a photoresistor 84. Into this gap 85 fits the semi circular segment 81 in FIG. 4 and interrupts the light beam throughout a 180° radial movement of the segment baffle 80 and correspondingly the wind vane 24. Throughout the other 180 degrees of radial movement of the segment baffle 80, the light beam between light emitting diode 83 and photoresistor 84 is not interrupted and therefore the resistance of the photoresistor 84 changes. This change of the electrical value is the directional signal and is fed through wires 86 and 87 in the wire harness 26 in FIGS. 1 and 2 to the mastercontrol 27.

Figure 6:
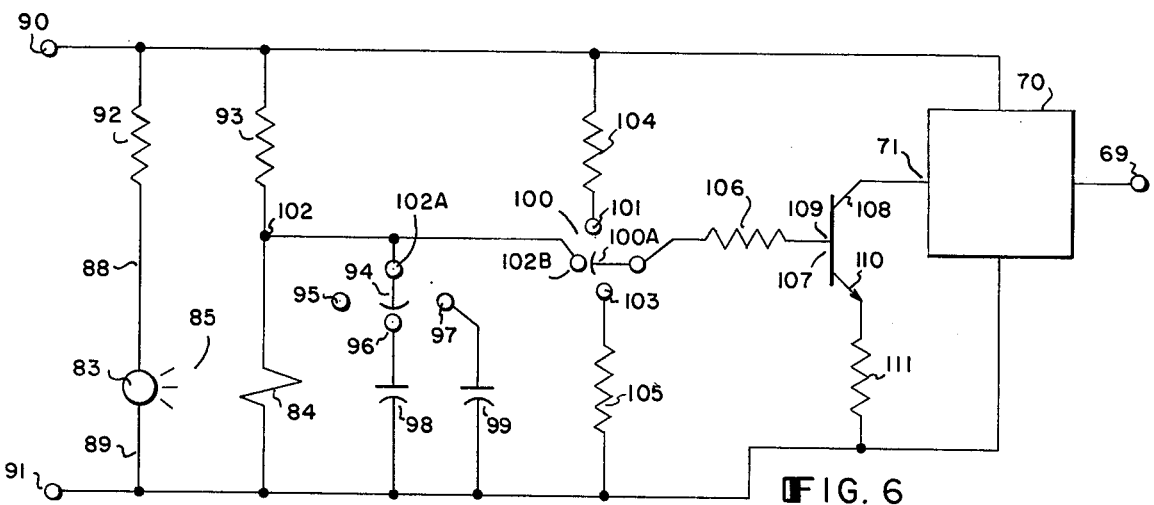
FIG. 6 is a simplified schematic of the direction sensing circuit including crosswind delay and mode selector in accordance with the present invention.

In FIG. 6 can be seen the directional signal circuit, which is capable of producing a useable signal for gating and counting on output terminal 69. A positive voltage is applied to terminal 90, supplying power through resistor 92 to the light emmitting diode 83, thus radiating light through gap 85 towards the photoresistor 84, which is biased positively through resistor 93, thus functioning as a voltage divider. With light beeing radiated towards the photoresistor 84, its resistance is of low value, therefore the result is a low voltage level at point 102, which is connected to switch 100 on contact 102B and through the moveable switcharm 100A and the resistor 106 to the NPN transistor 107 at its base 109. This prevents the transistor 107 from conducting and the input 71 to the signal decoder 70 will be high, better then 2 volts, and the output 69 will be a low voltage value, that is max. 0.4 volts, since the said signal decoder 70 is a schmitt trigger reversing the signal, and operating on 5 volts. When the wind changes, and the segment 81 in FIG. 4 is moved into the gap 85 seen in FIGS. 5 and 6, the light received at the photoresistor 84 is reduced, its resistance increases to a high value and with it the voltage at point 102. This voltage still transmitted via switcharm 100A of switch 100, resistor 106 to base 109 of transistor 107, now forward biasing the transistor 107 and making it conductive. This reduces the input 71 of signal decoder 70 to less then threshold voltage and therefore providing a high value of minimum 2.4 volts at the output 69.

As can be seen from above explanation, the output 69 of said signal decoder 70 varies from less then 0.4 volts to more then 2.4 volts depending on the direction of the wind.

Since the wind normally never changes from one direction to the other in an instant, but bounces back and forth as it changes its general direction, this change of the signal voltage is being selectively delayed to prevent the lights from flashing back and forth. This is achieved by adding selectively with switch 94 capacitor 98 to the signal line 102. When gap 85 unobstructed, then photoresistor 84 is low, signal on line 102 is low. When wind changes, gap 85 becomes obstructed, photoresistor goes high signal line 102 switched to capacitor 98 can not become high untill capacitor 98 is charged up. This depends on the value of the capacitor 98 and the resistor 93, which provide a corresponding time element until point 102 reaches the high voltage level. When the wind changes in the other direction, this process is reversed, but the capacitor 98 discharges through the photoresistor 84. For this reason photoresistor 84, resistor 93, resistor 106 and transistor 107 must be balanced to provide equal charge up or discharge time. Selector switch 94 provides multible contacts for additional capacitors added to the circuit, so as capacitor 99 is shown, to select the time delay from 1 to 3 minutes approximately, depending on the size of the airport and or local conditions.

Selector switch 100 which, with its moveable switch arm 100A placed in position of contact 102B, connects the wind direction sensing circuit to the input of the transistor 107 via resistor 106. Switch arm 100A moved to position of contact 101 provides a high voltage through resistor 104 on input of said transistor 107, while switch arm 100A moved to position of contact 103 provides a low, since connected to minus via resistor 105, to the input of said transistor 107, thus reversing the data and providing manual override control.

Figure 7:
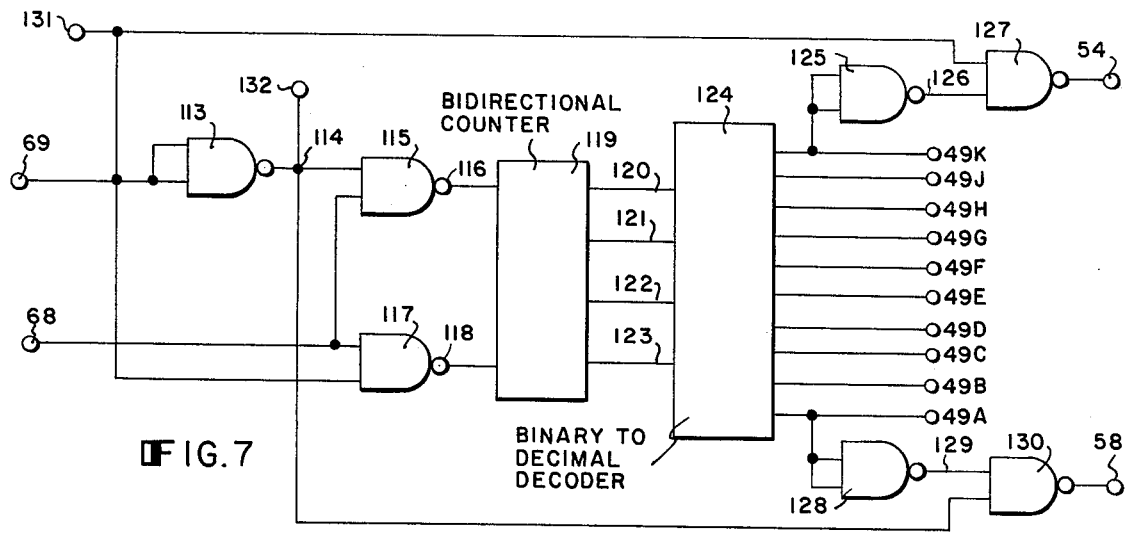
FIG. 7 is a schematic of the direction control logic and sequencing in accordance with the present invention.

In FIG. 7, terminal 69 and 68 represent the inputs, 54 and 58 as well as 49A,49B,49C,49D,49E,49F,49G,49H,-49I,49K the outputs, or the signal leads for the corresponding lights. For panel or remote display said outputs plus terminal 131 and 132 are used. Terminal 68 is for a clockpulse, the clock, a unijunction transistor controlled oscillator connected with a schmitt trigger as pulse shaper and not shown here since they are not new to the art. When direction signal applied to terminal 69 is high, inverter 113 produces a low on line 114, one input for dual nand gate 115, which produces a high on line 116, one input to the counter 119, an integrated bidirectional binary code decimal counter having two inputs, one for each direction, where the input for the none counting direction must be biased with a high in order for the other input to count. Therefore, changing the bias from one input to the other changes the direction of the count. Thus, when input on 116 is biased high, the input on 118 is enabled to count. Since the input on line 114 of gate 115, a dual nand gate, is low, the other input of said gate 115 which is connected to terminal 68 which carries the clockpulse, has no effect. Since the high on terminal 69 also appears on one input of dual nand gate 117, the other input of said gate 117 is enabled and, since connected to the pulse clock terminal 69, an inverted pulse appears on line 118, the enabled input of the counter 119 and, on the lines 120, 121, 122, 123 appears a binary coded decimal counting sequence in one direction. The direction of the count therefore corresponds with the signal applied to terminal 69 and, changing this signal from high to low will change the direction of the count.

The binary coded count on lines 120,121,122,123 becomes the inputs to the binary to decimal decoder 124 with ten outputs 49A, 49B,49C,49D,49E,49F,49G,49H,49I,49K for the power switching circuits, therefore those outputs are switched in a decimal sequence.

The outputs 54 and 58, which carry the signal for the runway endlights, a pair of inverters 125,128 and dual nand gates 127,130, are used in a similar way as the gates explained above, except the inverters 125,128 use the signal on any terminal 49, in this case 49A and 49K, as clock pulse and the nand gate 127 uses the directional signal from terminal 69, while nand gate 130 uses the inverted directional signal from connection 114, thus only one of either gates 127 or 130 will produce a signal for the flashes corresponding with the direction of the count.

Figure 8:
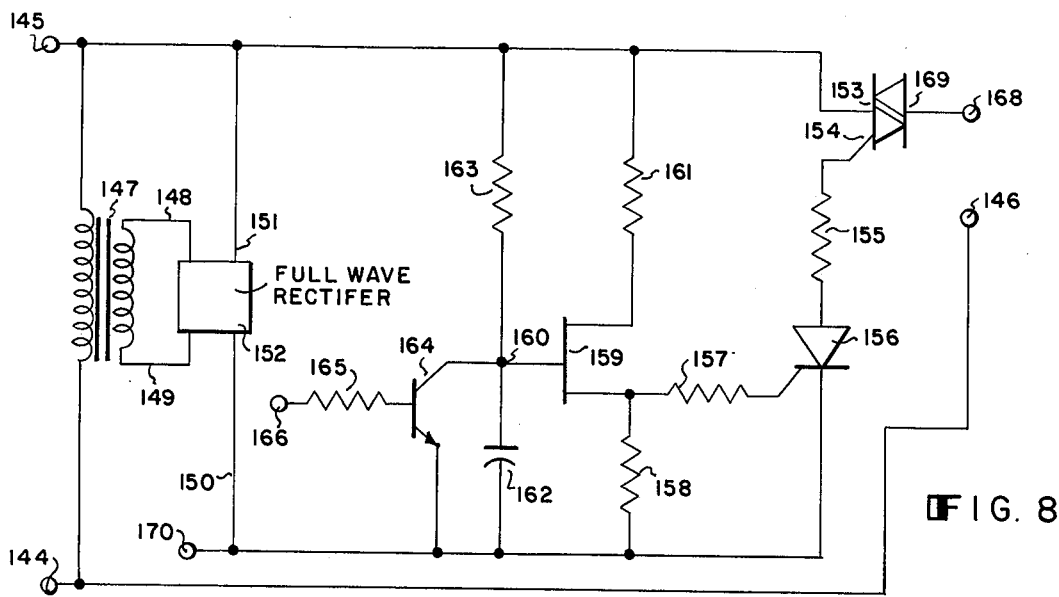
FIG. 8 is a schematic of the near zero phase switching circuits in accordance with the present invention.

In FIG. 8, a regular powerline is connected to terminals 144 and 145, and a lamp connected to the output terminals 146 and 168 will be turned on and off according to the signal on the input terminal 166. Unijunction transistor 159 resistor 157 and 158, capacitor 162 and resistor 163 and temperature compensating resistor 161 constitute a commonly used firing circuit. The capacitor 162 is shunted by a NPN transistor 164, which enables or prevents capacitor 162 from charging up to the firing voltage of the transistor 159 depending on the signal on terminal 166. The positive supply voltage at terminal 145 with reference to terminal 170 from the transformer 147 and fullwave rectifier bridge 152 for the unijunction firing circuit is in form of halfwaves, each returning to zero volts at each halfcycle and phase even with the voltage across the triac 169. Thus the scr 156 is triggered shortly after the zero voltage point, the small delay caused by resistor 163 and capacitor 162, which are kept as small as possible by electrical standards to guarantee proper firing with the least amount of time delay. This eliminates high current surges and reduces radio interference. Since the positive side of the firing circuit line 151 is connected to the cathode 153 of the triac 169, the gate becomes negative with respect to the cathode 153 and, first and third quadrant negative gate current and voltage is achieved, a most desirable and reliable configuration. Each light or pair of lights require their own trigger, scr and triac, and terminal 145 also provides positive halfwave supply voltage with reference to terminal 170 for all triggers required.

Thus there has been described an extraordinary reliable and efficient arrangement and method to communicate runway information automatically to all who need it in an extremely simple way.

Although this invention has been described with respect to its preferred application, it should be understood that many variations and modifications will now be obvious to those skilled in the art, and accordingly any such modifications or equivalent arrangements should be considered to be within the scope of the invention as defined in the appended claims.

LEGENDS FOR FIGS. 1 THROUGH 8

3, runway number. 21, runway number. 23, wind direction sensor. 24, wind vane. 27, mastercontrol. 32 through 41, light assemblies. 42,43,44,45, runway endlights. 48, solid state relay. 50, sequencer. 53,55,59, gates. 62, remote display. 65, clock. 67, pulse shaper. 70, signal decoder. 72, interface. 74, timing integrator. 77, shaft. 78, baffle. 79, tubular shaft. 80, baffle. 81, segment. 83, light emitting diode. 84, photoresistor. 92,93, resistor. 94, switch. 98,99, capacitor. 100, switch. 105,106, resistor. 107, transistor. 113, inverter. 115,117, gates. 119, counter. 124, decimal decoder. 125, inverter. 127, gate. 128, inverter. 130, gate. 147, transformer. 152, rectifier. 156, SCR. 157,158, resistors. 159, unijunction transistor. 162, capacitor. 161,163, resistors. 164, transistor. 169, TRIAC.

What is claimed is:

1. A bidirectional sequential flashing light system for use in an airport runway lighting system comprising:
   an opto electronic wind direction sensing means generating an output signal indicative of the direction,
   bidirectional counting means,
   said counting means responsive to said sensor output signal to count in a forward or reverse direction,
   flashing airport runway light means including a plurality of runway lights,
   solid state switch activating means responsive to the direction of said bidirectional counting means count,
   said light means connected to said switch means whereby the plurality of lights are activated in a sequential order thereby indicating the direction of the wind.

2. A flashing light system as claimed in claim 1 wherein the opto electronic wind direction sensor means input is the wind and said sensor means comprises light means and light detector means.

3. A flashing light system as claimed in claim 1 further including time delay means to delay the change of the sequentially flashing lights for a predetermined time following a change in the wind direction sensed by said wind sensor means.

* * * * *